United States Patent [19]

Vantouroux

[11] Patent Number: 4,610,564
[45] Date of Patent: Sep. 9, 1986

[54] DEVICE FOR GUIDING AND LOCKING THE COUPLING OF A CONNECTOR

[75] Inventor: Patrick Vantouroux, Fleury les Aubrais, France

[73] Assignee: Compagnie Deutsch, France

[21] Appl. No.: 657,391

[22] Filed: Oct. 3, 1984

[51] Int. Cl.4 .......................... B25G 3/00; F16D 1/00
[52] U.S. Cl. .................................... 403/316; 403/328; 285/316; 279/30
[58] Field of Search ................ 403/328, 316; 285/316, 285/315; 279/30, 75, 82

[56] References Cited

U.S. PATENT DOCUMENTS

| 632,560 | 9/1899 | Furbish | 279/82 |
| 1,635,909 | 7/1927 | Tobeler | 279/30 |
| 4,453,449 | 6/1984 | Hollmann | 403/328 X |

Primary Examiner—Andrew V. Kundrat
Attorney, Agent, or Firm—Darby & Darby

[57] ABSTRACT

The device for guiding and locking the coupling of the connector includes a guidance column 3 having a locking notch 5 cooperating with a cylindrical roller 6 urged by a leaf spring 7 borne by a sliding member 8.

9 Claims, 8 Drawing Figures

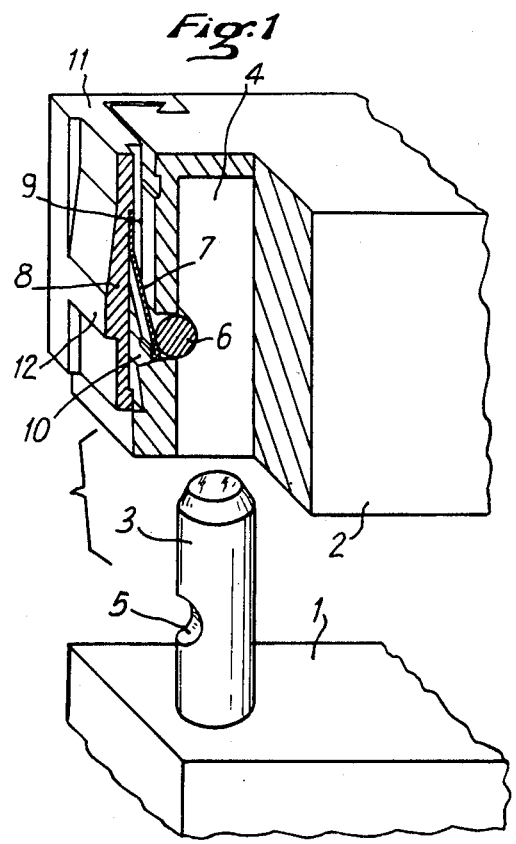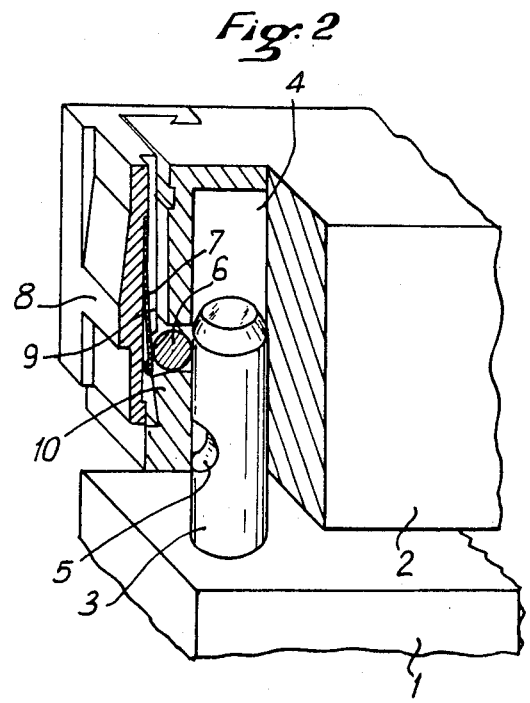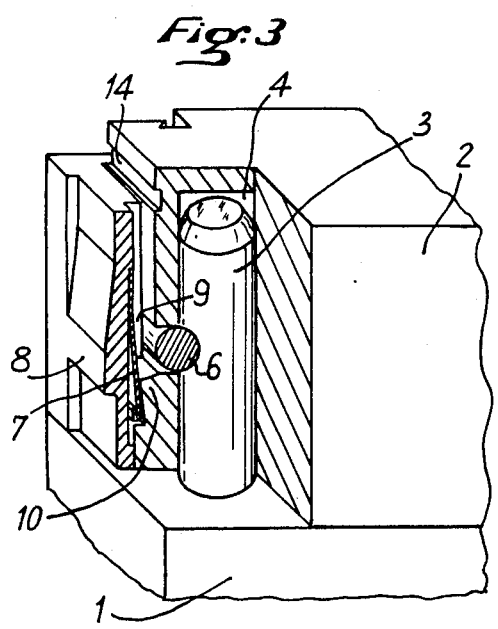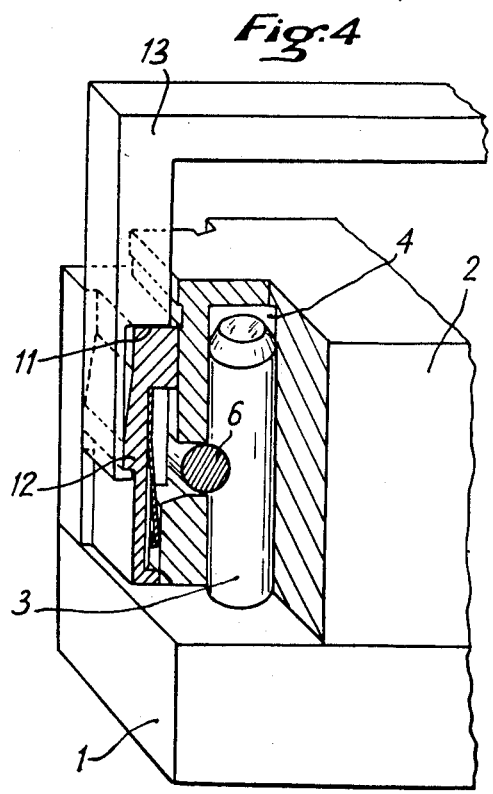

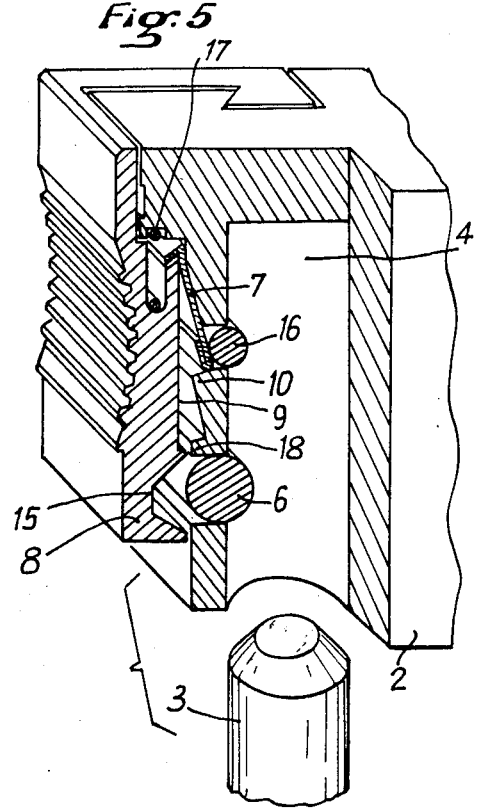
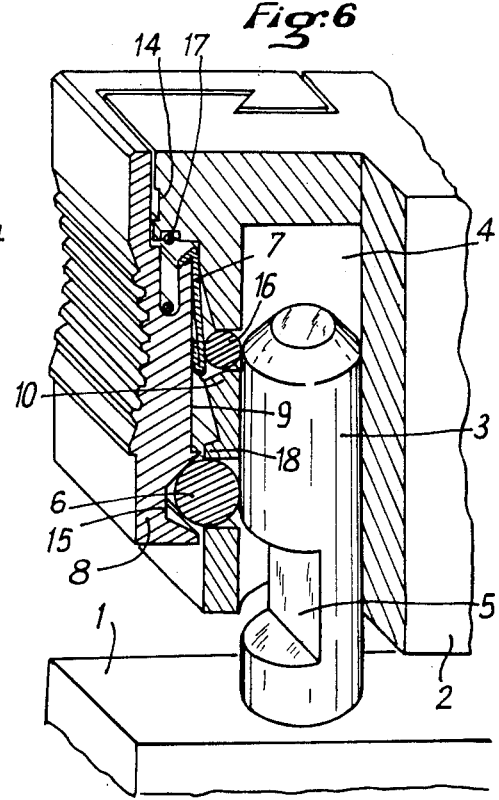
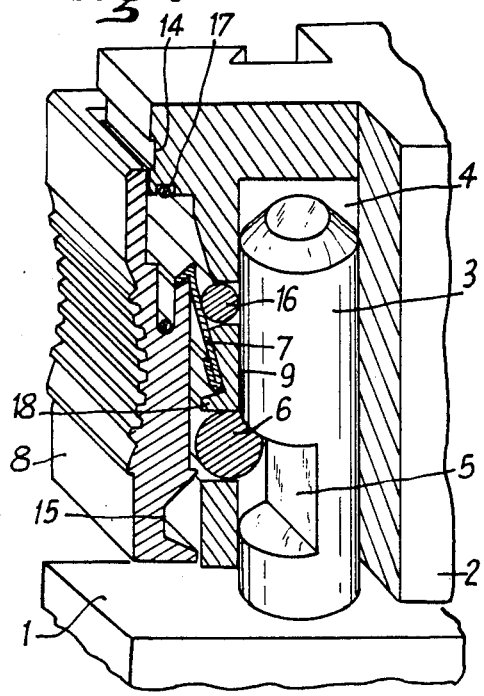
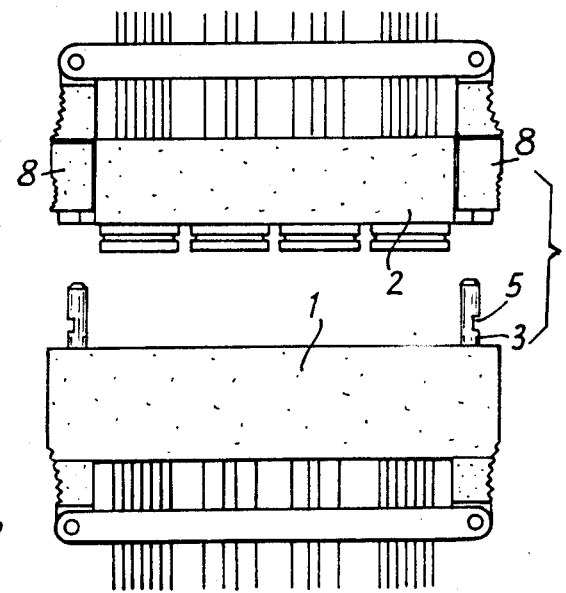

DEVICE FOR GUIDING AND LOCKING THE COUPLING OF A CONNECTOR

The present invention relates to electrical connectors of the so-called "push-pull" type and more particularly to a locking device for such units.

Up until a recent period, such connectors generally had a generally cylindrical form, the fitting together and the locking being provided by cylindrical sleeves and sliders sliding around blocks bearing the sockets and pins.

Such a unit is described in French Pat. No. 73,37329 filed on Oct. 19, 1973 in the name of the applicant.

Recent developments in the art lead to the adoption of connectors having the form of flat rectangular cassettes which can contain modular elements.

Such a unit is described in the French Patent filed on Apr. 15, 1983 under No. 83/06206 in the name of the applicant, entitled "Improved connector".

The function of guidance and locking on coupling should therefore be carried out by different means.

The object of the present invention is a device that insures in combination the guidance and the locking of the fixed and mobile parts of a "push-pull" connector, a device especially adapted—but not limited—to connectors in the form of cassettes with modular elements.

The device according to the invention is characterized by at least one guidance and locking assembly placed laterally to the fixed and mobile parts of a connector properly speaking, and comprising a guidance column borne by one of these parts (the first part) and cooperating with a cylindrical recess borne by the other part (the second part), the said column having a locking notch, and the second part having a cylindrical roller with axis perpendicular to the axis of the recess, lodged movably between two positions, namely a locking position in which the roller enters the recess to a depth close to that of the notch, and a coupling position in which the roller withdraws from the recess, the second part bearing an outer sliding member with a recess that allows the withdrawal of the roller in coupling position and a surface that holds it in locking position, the said sliding member presenting a leaf spring which, in unlocked position, repels a roller into the interior of the column recess and abuts against a stop or shoulder in the second part so as to be repelled and withdrawn when the said roller is repelled.

The invention also envisages the following arrangements:

(a) A single roller fulfills the two roller functions specified above.

(b) Two distinct rollers are provided, one cooperating with the column notch and the other acting on the holding spring in unlocked position.

(c) A spring is provided to repel the sliding member elastically toward the locking position.

These arrangements will be grasped more easily on reading the description which follows with reference to the attached drawing in which:

FIG. 1 is a perspective view, partially cut away, of an example of embodiment of the device of the invention, in uncoupled position.

FIG. 2 is an analogous view of the device in the course of coupling or uncoupling.

FIG. 3 is an analogous view in locked position.

FIG. 4 schematizes a tool for locking and unlocking.

FIGS. 5, 6 and 7 are analogous views of a variation of embodiment.

FIG. 8 is a diagrammatic view of a connector of cassette form equipped with the arrangements of the invention.

Referring to FIGS. 1 to 4, we see that the device according to the invention, which can be placed laterally to a connector 1, 2, of any form, has a cylindrical guidance column 3 on the first part 1 cooperating with a recess of the same section 4 placed on the second part 2; column 3 has a locking notch 5 (of cylindrical shape) with axis perpendicular to the axis of column 3, and the second part 2 has a cylindrical roller 6 lodged movably between a locking position (FIG. 3) in which roller 6 enters recess 4 and cooperates with notch 5 and a coupling position (FIG. 2) in which roller 6 is withdrawn from recess 4; roller 6 is repelled toward recess 4 by a leaf spring 7 borne by a sliding member 8, sliding on the second part 2; slider 8 also bears a surface 9 (ridge or convexity) forming a stop repelling and holding roller 6 in locking position when the slider is in locking position; the second part 2 bears a stop 10 cooperating with the end of leaf spring 7 and holding the slider in unlocked position (FIG. 1) until leaf spring 7 is sunk under the thrust of roller 6 in the course of the coupling (FIG. 2).

The device operates as follows:

The connector, uncoupled, is in the position shown in FIG. 1. Slider 8 is in unlocked position and cannot be displaced, leaf spring 7 being held by stop 10; roller 6 is repelled by leaf spring 7 into recess 4.

When the coupling is operated, column 3 is sunk into recess 4 and repels roller 6 (FIG. 2); roller 6 repels leaf spring 7 which is then disengaged from stop 10; stop surface 9 comes in contact with roller 6.

When the second part 2 reaches the position of coupling and locking, roller 6 drops into notch 5 (FIG. 3); stop surface 9 repels roller 6 into notch 5 and slider 8 can slide and assume the locking position in FIG. 3. In this position, slider 8 uncovers a visual end-of-locking mark 14.

The unlocking operation is carried out by simple traction on slider 8 whose translation liberates roller 6 and makes uncoupling possible.

Several devices such as those represented will generally be provided on the perimeter of a connector, for example, in the case of a connector in the form of a flat cassette, one device on each small side of the connector (FIG. 8).

The coupling and uncoupling can be carried out, for example by a manual thrust on slider 8, or by means of a specific tool 13 (FIG. 4) pressing on flange 11 for coupling, and on shoulder 12 for uncoupling.

In the example described, column 3 has a cylindrical notch 5 with horizontal axis. This notch can be replaced by an annular groove. It can have a circular section (FIGS. 1 to 4) or prismatic (FIGS. 5 to 7).

In the variation in FIGS. 5 to 7, there are two rollers 6 and 16 lodged movably in the first part of the connector. Roller 6 cooperates with notch 5 as in FIGS. 1 to 4; roller 16 is placed between roller 6 and the bottom of recess 4 and cooperates with spring 7 under the influence of column 3 already sunk beyond roller 6.

In addition, the surface 9 that repels roller 6 into locking position is constituted by the inner face of slider 8; there is a supplementary stop 18 on the outer face of part 2 to limit the movement of slider 8, which has a notch or recess 15 to insure the movement of roller 6 into unlocked position (FIGS. 5 and 6); and finally a spring 17 urges slider 8 continuously toward the locking position so that when roller 16 is repelled by column 3 and roller 6 enters notch 5, the slider automatically assumes the locking position (FIG. 7).

Thus slider 8 cannot be displaced toward the locking position as long as column 3 has not penetrated into recess 4 beyond roller 6; but then, once roller 6 has penetrated into notch 5, slider 8 automatically assumes the locking position under the influence of spring 17.

Stated differently, roller 16 serves to release leaf spring 7 from the shoulder 10 when the column 3 is sufficiently inserted into recess 4. When the post 3 continues its penetration into the cavity 4, the notch 5 and roller 6 become aligned, allowing spring 17 to automatically move slider 8 into its locked position as illustrated in FIG. 7.

I claim:

1. A device for guiding and locking first and second mating parts of a connector, comprising:
   a guidance column attached to and extending outwardly from said first connector part, said column having a notch therein, said notch being spaced a predetermined distance from the end of said column;
   a guidance column receiver integral with said second connector part, said receiver having a recess shaped and having an axial orientation so as to cooperate with said column in closely fitting relationship;
   a resiliently biased cylindrical roller in a slot located in a wall of said receiver, said roller being mounted transversely to said axial direction of said receiver, said roller being movable between a locking position in which it penetrates into said recess to a depth close to that of said notch and a coupling position in which said roller withdraws from said recess; and
   a locking member slidably mounted on said receiver, said member being movable between an unlocked position in which a spring connected to said locking member resiliently urges said roller into said recess, and a locked position in which a stop surface on said locking member prevents said roller from disengaging said notch in said column.

2. The device of claim 1, wherein said notch is semi-circular in profile.

3. The device of claim 1, wherein said notch is prismatic in profile.

4. The device of claim 1, wherein said spring has an end which abuts a shoulder on said receiver so as to prevent movement of said locking member to its locked position, until said roller is forced into said slot by penetration of said closely fitting guidance column, thus forcing said spring end off said shoulder.

5. The device of claim 4, further comprising a second spring mounted between said receiver and said locking member, said second spring resiliently repelling said locking member toward its locked position as soon as said spring is disengaged from said shoulder by said penetration of said column into said recess.

6. A device for guiding and locking first and second mating parts of a connector, comprising:
   a guidance column attached to and extending outwardly from said first connector part, said column having a notch therein, said notch being spaced a predetermined distance from the end of said column;
   a guidance column receiver integral with said second connector part, said receiver having a recess shaped and having an axial orientation so as to cooperate with said column in closely fitting relationship;
   a resiliently biased first cylindrical roller in a first slot located in a wall of said receiver, said roller being mounted transversely to said axial direction of said receiver, said first roller being movable between a position in which it partially penetrates into said recess and a coupling position in which said first roller is withdrawn from said recess;
   a second cylindrical roller is a second slot located in said receiver wall, said second roller also mounted transversely to said receiver axial direction, said second roller being movable between an unlocked position in which it is withdrawn from said recess, and a locked position in which it penetrates into said recess to approximately the depth of said notch;
   a locking member slidably mounted on said receiver, said member being movable between an unlocked position in which a first spring connected to said locking member resiliently urges said first roller into said recess and a holding space for said second roller is aligned with said second slot, and a locked position in which a stop surface on said locking member prevents said second roller from disengaging said notch in said column.

7. The device of claim 6, wherein said first spring has an end which abuts a shoulder on said receiver to prevent movement of said locking member to its locked position until said guidance column forces said first roller out of said recess and against said first spring.

8. The device of claim 7, wherein said first slot is located further in said recess than said second slot, so that said locking member may not move to its locked position until a predetermined penetration of said column into said recess takes place.

9. The device of claim 8, further comprising a second spring mounted between said receiver and said locking member, said second spring resiliently repelling said locking member toward its locked position as soon as said first spring is disengaged from said shoulder by said penetration of said column into said recess.

* * * * *